June 2, 1931.　　　W. K. LIGGETT　　　1,808,421
LOADING MACHINE
Filed Aug. 8, 1924　　　2 Sheets-Sheet 1
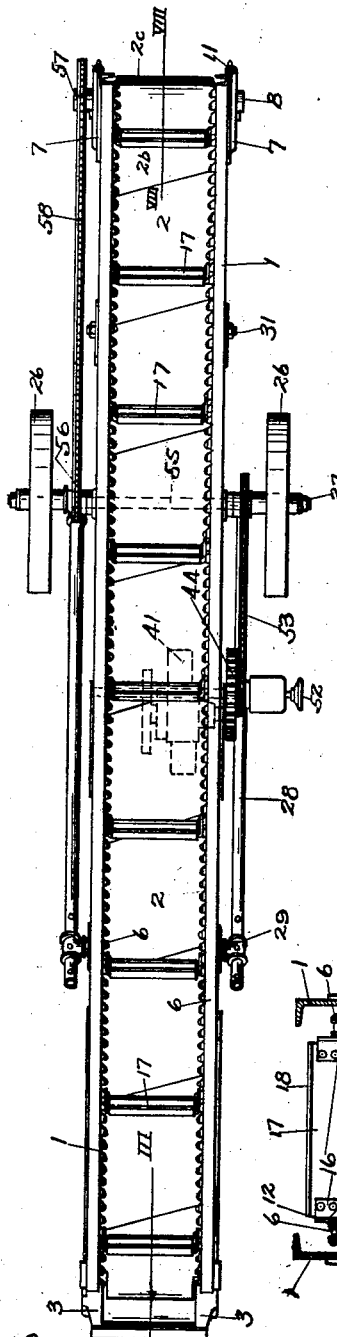
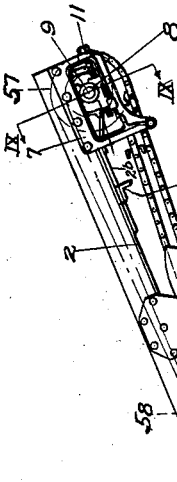
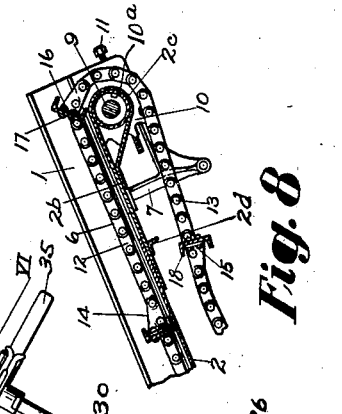
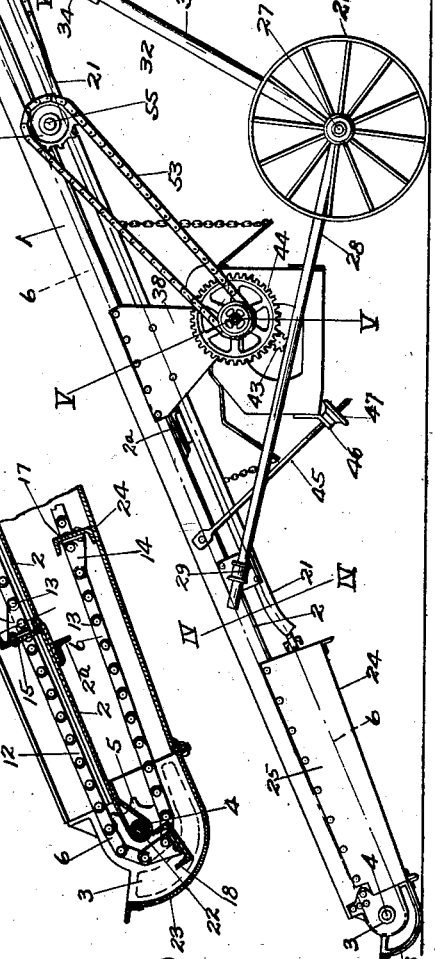

June 2, 1931. W. K. LIGGETT 1,808,421
LOADING MACHINE
Filed Aug. 8, 1924 2 Sheets-Sheet 2

Patented June 2, 1931

1,808,421

UNITED STATES PATENT OFFICE

WILLIAM K. LIGGETT, OF COLUMBUS, OHIO, ASSIGNOR TO THE JEFFREY MANUFACTURING COMPANY, OF COLUMBUS, OHIO, A CORPORATION OF OHIO

LOADING MACHINE

Application filed August 8, 1924. Serial No. 730,950.

The present invention relates to certain new and useful improvements in loading machines, of the type having an elongated conveyor adapted to be conveniently moved from place to place, and to receive material at points adjacent the ground and discharge it at a suitable elevation for loading into wagons and the like.

The especial object of this invention is to provide an improved arrangement of parts whereby is produced a simple and inexpensive but highly efficient, convenient and durable machine.

The means whereby I attain this object are fully set forth in the following specification and illustrated in the accompanying drawings of which—

Fig. 1 is a side elevation of the preferred embodiment of my invention.

Fig. 2 is a plan view of the machine illustrated in Fig. 1.

Fig. 3 is a sectional view taken along the line III—III of Fig. 2.

Fig. 4 is a sectional view taken along the line IV—IV of Fig. 1.

Fig. 8 is a sectional view taken along the line VIII—VIII of Fig. 2.

Like numerals refer to similar parts in the several figures.

Figure 5:
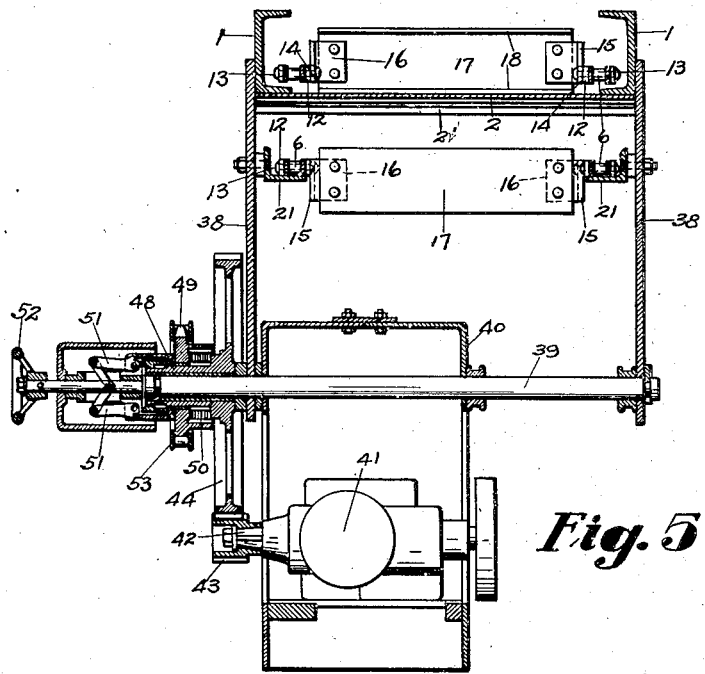
Fig. 5 is a sectional view taken along the line V—V of Fig. 1.
Figure 7:
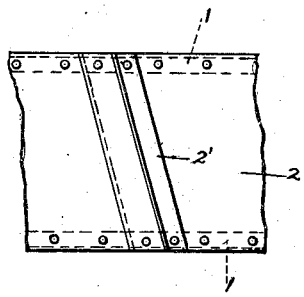
Fig. 7 is a fragmentary bottom view of the conveyor trough illustrating the method of forming the joints between the successive plates of the bottom of the conveyor trough.
Figure 6:
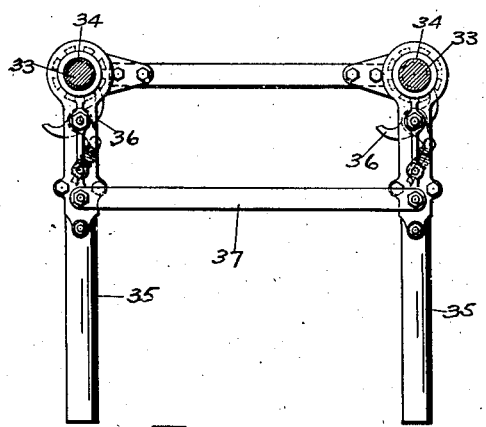
Fig. 6 is a sectional view taken along the line VI—VI of Fig. 1.
Figure 9:
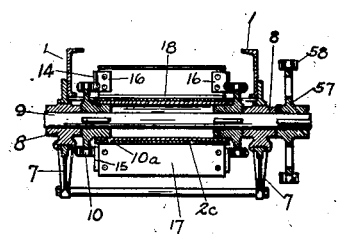
Fig. 9 is a sectional view taken along the line IX—IX of Fig. 1.

As shown in the drawings my improved loading machine comprises a rigid supporting frame made up of two parallel channel bars 1 joined together by a series of transversely extending plates 2 and constituting a trough along which material may be propelled in the manner to be hereinafter described. The channel bars 1 are disposed with their flanges projecting inwardly, and form the sides of the conveyor trough. The plates 2 are rhomboidal in form, their lateral edges are securely riveted to the bottom flanges of the channel bars 1, and their inclined transverse edges overlap in the direction of movement of material along the trough to prevent the leakage of fine material through the joints of the trough bottom. The plates 2 being too thin to permit of countersinking, rivets are inadmissible for joining adjacent plates, and angle bars 2a secured to the channel bars 1 and extending parallel with and beneath the overlapping edges of said plates, hold them in straight transverse alignment.

Attached to the forward ends of the channel bars 1 are end castings 3 arranged to support the foot shaft 4, and upon this foot shaft is mounted a pair of sprocket wheels 5 around which travels the conveyor chains 6. At the opposite end of the main frame are secured guide frames 7 in which the journal boxes 8 are slidably supported, and in these boxes the head shaft 9 is journaled. Fixed to the head shaft 9 is a pair of sprocket wheels 10 arranged to engage the conveyor chains 6 which are actuated by the rotation of the head shaft 9. Adjusting screws 11 associated with the guide frames 7 are arranged to move the journal boxes 8 to tension the conveyor chains.

The conveyor chains 6 are composed of overlapping side bars 12 connected by pintles 13 in the manner which is common in the conveyor art. At suitable intervals there are included attachment links 14 which have extensions 15 projecting rearwardly of the pintles 13, and terminating in inwardly projecting flanges 16. To the flanges 16 are secured, by suitable attachment bolts, rivets, or the like, the conveyor flights 17 which extend substantially perpendicularly to the longitudinal lines of the conveyor, and by which material is propelled along the conveyor trough. The flights 17 are formed of steel bar stock of channel cross section, having forwardly projecting flanges 18, and the proportions of the parts are such that a straight line connecting the edges of the flanges 18 will pass through the axes of the pintles 13, as indicated at 20 in Fig. 3. The flights 17 rest directly upon and slide along the bottom plate 2 of the conveyor trough, and they carry the otherwise unsupported weight of the upper run of the conveyor chain. Because of their inclination relative to the advancing edges of the flights 17, and to the direction of their travel, the tendency for the joints of the conveyor trough to obstruct movements of the conveyor flights 17 is entirely prevented. Angle bars 21, suspended beneath the channel bars 1, afford a supporting slideway along which the lower run of the conveyor chains 6 travel. At the foot end of the conveyor the bottom plate 2 is formed into a cylindrical loop 22 which encircles the foot shaft 4, and the radii of the loop 22 and of the sprocket wheels 5 are such that contact is established between the forward edges of the inner flanges 18 and the surface of the plate 2 before said flights begin to turn about the foot shaft 4.

At the head end of the conveyor the bottom plate 2b is formed into a loop 2c which encircles the head shaft 9, and this loop encircles and bears upon the hub extensions 10a of the sprocket wheel 10. The plate 2b is slidable between the adjacent bottom plate and the supporting angle 2d, so that said plate will follow the head shaft 9 when it is moved longitudinally of the conveyor to adjust the tension of the chains 6. The radii of the sprocket wheels 10 and of the loop 2c are such that contact is maintained between the flanges 18 and the plate 2b while the flights 17 are turning about the head shaft 9, thus insuring perfect delivery of material from the conveyor trough.

Formed on the castings 3 are suitably shaped flanges to which are attached the curved plates 23 adapted to contact with and slide over the ground to supply a supporting shoe for the forward end of the conveyor frame, and a shield for the moving parts of the conveyor. The plate 23 is of helical curvature, closely approaching the lowermost part of the path of travel of the conveyor flights 17, and affording a gradual upwardly increasing clearance between the flights 17 and the shoe plate 23. The curved shoe plate 23 and the end castings 3 together constitute a loading boot adapted to receive material which is to be loaded, and the upwardly increasing clearance in this boot prevents its becoming choked by the wedging of material between the edges of the conveyor flights and the curved shoe plate 23. This shield is extended rearwardly beneath the conveyor by a guard plate 24 which is folded to form lateral upwardly extending flanges 25 by which said plate is attached to the channel bars 1, and these flanges are so shaped as to afford a gradually decreasing clearance for the conveyor flights 17 in the direction of their travel. As the chains 6 leave the forward ends of the guide angles 21 they sag sufficiently to cause the conveyor flights 17 to contact with the guard plate 24 and slide over the surface of said plates into the loading boot.

To support the above described conveyor in inclined position, and for convenience in moving it from place to place, I have provided a pair of ground engaging wheels 26 which are mounted upon an axle 27 positioned beneath the conveyor frame a little to the rear of its center of gravity. The axle 27 is connected to the main frame by a pair of forwardly extending struts 28 pivotally connected to the conveyor frame at 29, and by a pair of rearwardly extending struts 30 pivotally connected to the conveyor frame at 31. The struts 30 are each composed of two telescoping members 32 and 33, and the member 33 is screw threaded and fitted with a nut 34 which may be screwed either upwardly or downwardly to vary the effective length of the strut 30 and thereby adjust the inclination of the conveyor trough. For convenience of manipulation I have provided the ratchet levers 35 each of which carries a double direction pawl 36 adapted to engage ratchet teeth formed upon the periphery of the nuts 34, and by the oscillation of the levers 35 the nuts may be screwed either upwardly or downwardly at the option of the operator. To insure uniformity of adjustment the ratchet levers 35 are connected together by a link 37 which causes them to oscillate in unison. Other means may be employed to effect the elongation or contraction of the struts 30 if preferred, the devices above described being but illustrative of a suitable method.

Rigidly attached to the channel bars 1 by the downwardly projecting brackets 38 is a shaft 39 which extends transversely beneath the conveyor in approximately the vertical plane of its center of gravity, and upon this shaft is suspended the framework 40 wherein is mounted the motor 41 by which the conveyor is actuated. The motor 41 may be of any preferred type suitable to the conditions under which the machine operates. For purposes of illustration I have shown an internal combustion engine the driving shaft 42 of which extends parallel with the suspension shaft 39, and to this driving shaft 42 is fixed a spur pinion 43 which meshes with a spur gear 44 freely rotatable upon the projecting end of the suspension shaft 39. In order that the lubricating devices of the motor 41 may properly function the motor must be kept approximately level, and I have provided a rod 45 pivotally connected to the conveyor frame and projecting through an aperture of the lug 46 attached to the suspension frame 40. Threaded upon the rod 45 is a hand wheel nut 47 by the adjustment of which the frame 40 may be swung about the suspension shaft 39 to restore the equilibrium of the motor 41 with each change of inclination of the conveyor frame. The rod 45 also resists the torque of the motor and its tendency to cause oscillation of the suspension frame 40 about the shaft 39. The spur gear 44 has an elongated hub 48 upon which is rotatively mounted a sprocket wheel 49. This sprocket wheel may be operatively connected with the spur gear 44 by any suitable clutch mechanism. For purposes of illustration I have shown a multiple disc friction clutch 50 having a system of toggle levers 51 adapted to be controlled by movement of a hand wheel 52 longitudinally of the shaft, and movement of the toggle levers 51 controls the actuation of the clutch. As such clutches are well understood in the art, and as they form no part in the present invention further description and illustration of these devices is not thought to be required at this time. An endless chain 53 connects the sprocket wheel 49 with the counter shaft 55, and the counter shaft 55 is connected with the head shaft 9 of the conveyor through the sprocket wheels 56 and 57 and the endless chain 58 to actuate the conveyor.

What I claim is:—

1. In a machine of the class described, the combination with a supporting frame consisting of two parallel spaced apart vertically rigid side members joined by a series of smooth flat plates of rhomboidal form and constituting a trough, the inclined edges of said rhomboidal plates being arranged transversely of said trough, and means carried by said frame to propel material along said trough.

2. In a machine of the class described, the combination with a supporting frame consisting of two parallel spaced apart channel bars having their flanges projecting inwardly and a series of transversely extending plates, said plates being relatively short with respect to the length of said channel bars and being rigidly attached to the bottom flanges of said channel bars and constituting a trough, and means supported by said frame to propel material along said trough.

3. In a machine of the class described, the combination with a supporting frame consisting of two parallel spaced apart bars and a series of transversely extending smooth flat plates of rhomboidal form rigidly attached to said bars and constituting a trough, the inclined edges of said rhomboidal plates being arranged transversely of said trough, and means supported by said frame to propel material along said trough.

4. In a machine of the class described, the combination with a trough consisting of two parallel spaced apart channel bars joined by a series of transversely extending smooth flat plates of rhomboidal form having their inclined edges arranged transversely of said trough, a series of transversely extending spaced apart scrapers adapted to rest upon and slide over the bottom of said trough, a flexible draft device extending longitudinally of said trough attached to and carrying said scrapers, and means to longitudinally move said draft device to propel said scrapers along said trough.

5. In a machine of the class described, the combination with a trough consisting of two parallel spaced apart channel bars joined by a series of transversely extending smooth flat plates of rhomboidal form having their inclined edges arranged transversely of said trough, transversely extending spaced apart scrapers adapted to rest upon and slide over the bottom of said trough, a pair of similar flexible draft devices extending longitudinally of said trough attached to the opposite ends of said scrapers and carried thereby, and means to longitudinally move said draft devices to propel said scrapers along said trough.

6. In a machine of the class described, an elongated conveyor trough, a loading boot on one end thereof, conveyor means adapted to slide in said trough and to travel in said boot, and said boot being constructed to form with said conveyor means therein, a mouth having upwardly diverging walls.

7. In a conveyor, the combination with an elongated trough having a bottom plate, of a series of transversely extending spaced apart scrapers adapted to slide over said bottom plate, two endless chains attached to said scrapers adapted to propel them along and return them below said bottom plate, a shaft carried by said trough, sprocket wheels upon said shaft around which said chains turn to enter said trough, a sleeve surrounding said shaft, and a loop formed in the bottom plate surrounding said sleeve, and adapted to establish contact with said scrapers before they enter said trough.

8. A conveyor trough having its bottom formed of a plurality of plates upon which is adapted to slide a conveyor, the contiguous edges of said plates being inclined transversely to the direction of travel of said conveyor.

9. In a conveyor, the combination with an elongated trough having a bottom plate, of a series of transversely extending spaced apart scrapers adapted to slide over said bottom plate, a shaft adjacent one end of the trough around which the scrapers turn, means to propel said scrapers along said bottom plate, said scrapers adapted to be arranged in other than radial relationship to the shaft when passing around the same, and a curved surface at one end of said plate upon which said scrapers slide as they change their direction of travel.

10. In a conveyor, the combination with an elongated trough, of a series of transversely extending spaced apart scrapers adapted to travel along and return beneath said trough and to describe an arcuate path when entering said trough, and a curved shield closely approaching said arcuate path beneath said trough and diverging upwardly therefrom.

11. In a conveyor, the combination with an elongated trough, of a series of transversely extending spaced apart scrapers adapted to travel along and return beneath said trough and to describe an arcuate path when entering said trough, and a shield of helical curvature closely approaching said arcuate path beneath said trough and diverging upwardly therefrom.

12. In a machine of the class described, the combination with an elongated trough, of two endless chains extending longitudinally thereof composed of overlapping side bars joined by transverse pintles, an attachment link included in each of said chains having an extension projecting rearwardly of its rearward pintle, and a conveyor flight extending between said chains and attached to said extensions.

13. In a machine of the class described, the combination with an elongated trough, of two endless chains extending longitudinally thereof composed of overlapping side bars joined by transverse pintles, an attachment link included in each of said chains having an extension projecting rearwardly of its rearward pintle and terminating in an inwardly projecting flange, a conveyor flight extending between said chains and attached to said flange, and a forwardly projecting flange formed on said flight adapted to sliding contact with the bottom of said trough.

14. In a machine of the class described, the combination with an elongated trough, of two endless chains extending longitudinally thereof composed of overlapping side bars joined by transverse pintles, an attachment link included in each of said chains having an extension projecting rearwardly of its rearward pintle and terminating in an inwardly projecting flange, a conveyor flight extending between said chains and attached to said flange, and a forwardly projecting flange formed on said flights and adapted to sliding contact with the bottom of said trough the proportions of said parts being such that the axis of said pintle and the forward edge of said flange lie in a plane extending substantially perpendicularly to the bottom of said trough as and for the purpose set forth.

15. In a machine of the class described, the combination with an elongated trough, of two endless chains extending longitudinally thereof composed of overlapping side bars and transverse pintles, an attachment link included in each of said chains having an extension projecting rearwardly from its rearward pintle, a conveyor flight extending between said chains attached to said extensions, and flanges formed on the longitudinal edges of said flights projecting forwardly therefrom to a transverse plane passing substantially through said rearward pintle as and for the purpose set forth.

16. In a machine of the class described, the combination with an elongated trough, of two endless chains extending longitudinally thereof composed of overlapping side bars joined by transverse pintles, an attachment link included in each of said chains having an extension projecting rearwardly of its rearward pintle, a conveyor flight extending between said chains attached to said extensions, and a forwardly projecting flange formed on the lower edge of said flight and projecting forwardly therefrom to a plane extending substantially perpendicularly to the bottom of said trough and passing substantially through the axis of said rearward pintle as and for the purpose set forth.

17. In a conveyor, the combination with an elongated trough having a bottom plate, of a series of transversely extending spaced apart scrapers adapted to slide over said bottom plate, a shaft adjacent one end of the trough around which the scrapers turn, means to propel said scrapers along said bottom plate, said scrapers adapted to be arranged substantially parallel to the bottom plate throughout the major portion of their travel when moving around the shaft, and a loop at one end of said plate upon which said scrapers slide as they change their direction of travel.

18. A conveyor trough having one of its walls comprising a plurality of sections having their meeting edges inclined with respect to a plane perpendicular to the bottom of said trough.

19. In a machine of the class described, the combination with an elongated trough, of an endless chain extending longitudinally thereof composed of overlapping side bars joined by transverse pintles, an attachment link included in said chain having an extension projecting rearwardly of its rearward pintle, and a conveyor flight attached to said extensions.

20. In a conveyor, the combination with an elongated trough, of a series of transversely extending spaced apart scrapers adapted to slide in said trough, a pair of endless chains attached to said scrapers adapted to propel them along said trough, a shaft carried by said trough, sprocket wheels mounted on said shaft around which said chains travel, a sleeve surrounding said shaft and carried by said sprocket wheels, and said trough having an arcuate plate supported upon said sleeve and partially surrounding the same, said arcuate plate being arranged to establish contact with said scrapers as they are carried around by said sprocket wheels.

21. In a conveyor, the combination with an elongated trough, of a series of transversely extending spaced apart scrapers adapted to slide in said trough, a shaft adjacent one end of the trough around which said scrapers turn, means to propel said scrapers through said trough, and said scrapers adapted to be arranged in other than radial relationship to the shaft when passing around the same.

22. In a conveyor, the combination with an elongated trough, of a series of transversely extending spaced apart scrapers adapted to slide in said trough, a shaft adjacent one end of the trough around which the scrapers turn, means to propel said scrapers through said trough, and said scrapers adapted to be arranged substantially parallel to the bottom of said trough throughout the major portion of their travel when moving around said shaft.

In testimony whereof I have hereunto set my hand.

WILLIAM K. LIGGETT.